United States Patent
Lindner et al.

(10) Patent No.: US 9,283,709 B2
(45) Date of Patent: Mar. 15, 2016

(54) CONTAINER TREATMENT PLANT COMPRISING AN OVEN AND A BLOW MOLDER WITH INDIVIDUALLY DRIVEN CARRIERS FOR PREFORMS

(71) Applicant: KRONES AG, Neutraubling (DE)

(72) Inventors: Peter Lindner, Langquaid (DE); Thomas Albrecht, Beilngries (DE); Wolfgang Hahn, Neutraubling (DE); Konrad Senn, Regensburg (DE); Markus Zoelfl, Metten (DE); Stefan Raith, Pfatter (DE); Holger Neugebauer, Regenstauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/474,656

(22) Filed: Sep. 2, 2014

(65) Prior Publication Data
US 2015/0079220 A1    Mar. 19, 2015

(30) Foreign Application Priority Data
Sep. 13, 2013    (DE) .......................... 10 2013 218 399

(51) Int. Cl.
| | |
|---|---|
| *B29C 49/64* | (2006.01) |
| *B29C 49/42* | (2006.01) |
| *B29C 49/06* | (2006.01) |

(Continued)

(52) U.S. Cl.
CPC ......... *B29C 49/6409* (2013.01); *B29C 49/4205* (2013.01); *B29C 49/06* (2013.01); *B29C 49/28* (2013.01); *B29C 49/36* (2013.01); *B29C 49/421* (2013.01); *B29C 49/4215* (2013.01); *B29C 49/4236* (2013.01); *B29C 49/6436* (2013.01); *B29C 49/68* (2013.01); *B29C 49/786* (2013.01); *B29C 49/80* (2013.01); *B29C 2049/4226* (2013.01); *B29K 2105/258* (2013.01); *B29L 2031/712* (2013.01)

(58) Field of Classification Search
CPC ............ B29C 49/6409; B29C 49/4205; B29C 49/4215; B29C 2049/4226; B29C 49/421; B29C 49/4236; B29C 49/6436
See application file for complete search history.

(56) References Cited

U.S. PATENT DOCUMENTS

| | | | | |
|---|---|---|---|---|
| 3,947,180 A | * | 3/1976 | Neumaier | ...................... 425/533 |
| 4,409,455 A | * | 10/1983 | Belcher et al. | ................. 219/775 |

(Continued)

FOREIGN PATENT DOCUMENTS

| | | |
|---|---|---|
| DE | 2742693 A1 | 4/1979 |
| DE | 3910293 C2 | 10/1991 |

(Continued)

OTHER PUBLICATIONS

Search Report, European Application No. 14179251, Jan. 19, 2015.

(Continued)

*Primary Examiner* — Robert B Davis
(74) *Attorney, Agent, or Firm* — Marshall, Gerstein & Borun LLP

(57) ABSTRACT

A container treatment plant having an oven, a blow molder located downstream of the oven and used for processing a plurality of container blanks, such as preforms, and a conveying unit configured for conveying a plurality of carriers, each carrier being provided for accommodating at least one container blank, and the conveying unit and the carrier being adapted to one another such that each carrier is individually movable through the oven.

16 Claims, 5 Drawing Sheets

(51) Int. Cl.
  *B29C 49/28* (2006.01)
  *B29C 49/36* (2006.01)
  *B29C 49/68* (2006.01)
  *B29C 49/78* (2006.01)
  *B29C 49/80* (2006.01)
  *B29K 105/00* (2006.01)
  *B29L 31/00* (2006.01)

(56) References Cited

U.S. PATENT DOCUMENTS

| | | | | |
|---|---|---|---|---|
| 4,456,447 | A * | 6/1984 | Smith | 425/182 |
| 6,926,094 | B2 * | 8/2005 | Arntson et al. | 173/32 |
| 7,264,426 | B2 * | 9/2007 | Buttrick, Jr. | 408/1 R |
| 7,946,842 | B2 | 5/2011 | Gillet | |
| 2004/0047941 | A1 * | 3/2004 | Salenbien et al. | 425/526 |
| 2004/0121038 | A1 | 6/2004 | Seki et al. | |
| 2010/0140052 | A1 * | 6/2010 | Martini | 198/419.2 |
| 2010/0236445 | A1 * | 9/2010 | King et al. | 104/130.03 |
| 2011/0236517 | A1 | 9/2011 | Senn et al. | |
| 2013/0026005 | A1 | 1/2013 | Senn | |

FOREIGN PATENT DOCUMENTS

| | | |
|---|---|---|
| DE | 102010018153 A1 | 10/2011 |
| DE | 102013208061 A1 | 7/2013 |
| EP | 2052842 A1 | 4/2009 |
| FR | 2890059 A1 | 3/2007 |
| GB | 2004805 A | 4/1979 |
| WO | WO-0189791 A1 | 11/2001 |

OTHER PUBLICATIONS

Search Report, German Application No. 10 2013 218 399.2, dated Feb. 10, 2015.

* cited by examiner

CONTAINER TREATMENT PLANT COMPRISING AN OVEN AND A BLOW MOLDER WITH INDIVIDUALLY DRIVEN CARRIERS FOR PREFORMS

CROSS-REFERENCE TO RELATED APPLICATION

The present application claims priority to German Application No. 10 2013 218 399.2, filed Sep. 13, 2013. The priority application, DE 10 2013 218 399.2 is hereby incorporated by reference.

FIELD OF THE DISCLOSURE

The present disclosure relates to a container treatment plant having an oven and a blow molder located downstream of the oven and used for processing a plurality of container blanks, such as preforms, and further a conveying unit configured for conveying a plurality of carriers, each carrier being provided for accommodating at least one container blank.

BACKGROUND

Conveying units are here conveying means having carriers for the container blanks, which are conveyed in a closed loop.

Apparatuses for blow molding objects from prefabricated parisons, which are also referred to as container blanks or preforms, are known from the prior art, e.g. from DE 10 2010 018 153 A1.

In addition, DE 3 910 293 C2 discloses an apparatus for blow molding objects from prefabricated parisons, comprising a conveying unit, which moves the parisons through a heating station including an infrared radiator, wherein the respective parisons are attached to a mandrel of a holder, with the neck area facing downwards, and are rotated about their vertical axis while they are conveyed, and further comprising a unit for removing the heated parisons from the holders at a removal station located downstream of the heating station and for transferring the parisons to at least one blow molding station, wherein said conveying unit comprises at least one conveyor chain moving the parisons intermittently to the removal station and wherein a respective holder is releasably secured to two neighboring chain links of the conveyor chain, so that the distance between the holders can be adjusted in the conveying direction so as to minimize the spaces between the parisons to be heated, if said parisons should have different diameters.

This known prior art is, however, disadvantageous insofar as it is rather cumbersome to process differently configured containers, since such processing always requires, in advance, a complicated adaptation of the carriers coupled to the conveyor chain.

SUMMARY OF THE DISCLOSURE

One aspect of the present disclosure is to provide a particularly cost-efficient oven, which includes a conveying unit and which is adapted to be flexibly charged with preforms and allows easy changeover operations.

According to the present disclosure, this aspect is achieved in that the conveying unit and the carrier are adapted to one another such that each carrier is individually movable through the oven by means of said conveying unit, i.e. each carrier can be driven through the oven independently and/or decoupled from the other carriers.

According to an advantageous further development, the conveying unit and the carrier are adapted to one another such that each carrier can be used for individually moving a preform through the oven by means of said conveying unit. Guiding the carriers with preforms individually through the oven allows each individual preform to be heated according to the respective demands to be satisfied.

It is also of advantage when the same conveying unit which fully extends through the oven also extends through the blow molder, so that the same carrier can be moved through the oven as well as through the blow molder, with the container blank remaining inserted therein. There is no need of transferring, repositioning and/or displacing the container blanks from a first carrier in the oven to a second carrier in the blow molder. One and the same carrier can be used in both processing units as well as on the way between them. In addition, it is in particular possible to use the conveying unit in question also on other conveying paths. The conveying unit in question may, for example, also be advantageously used in the case of a blocked machine on the transfer path, e.g. between a blow molding machine and a filling unit or a labelling machine or the like.

It is also of advantage when at least one of the carriers includes a servomotor used for the purpose of driving. Due to the reasonable price at which servomotors are nowadays available, it is possible to use such drive units also singularly for each individual carrier and to keep costs low nevertheless. The servomotor can also be adjusted with the aid of simple means such that each carrier can be conducted through the oven independently of the other carriers and that each carrier preferably has different speeds at specific intervals of the conveying unit. The respective speeds of the individual carriages may also be controlled automatically.

The use of conveyor chains having a fixed pitch can effectively be dispensed with, when one of the carriers is configured for movement in a magnetic force dependent manner, preferably in interaction with a conveying path of the conveying unit, on which the carrier slidingly rests. The principle of a linear synchronous motor with a plurality of freely controllable runners can here be used in an advantageous manner.

Via a control unit it is also possible to influence the motion profile of each individual carrier such that the distances which the preforms have relative to one another are controlled at each position of the oven, whereby the pitch of the oven can be rendered flexible. When the oven has a flexible pitch, it is possible to conduct the preforms such that e.g. small preforms move through the oven at smaller distances from one another and large preforms at larger distances from one another. This guarantees a maximum energy efficiency adapted to the respective specific preform.

When the carrier includes a carriage section, which rests on the conveying path, and the carrier comprises at least one rotary holder projecting from the carriage section and configured for rotatingly accommodating a container blank, a container blank or preform supported by a carrier can be caused to rotate, so that the wall of the container blank/preform is acted upon throughout its whole area by heat radiated from the oven, e.g. via an infrared radiator. In addition, the container blank can, depending on its translatory motion, be rotated with different speeds so that the different container wall areas are acted upon by heat for periods of different lengths. Thus, the container blanks can be shaped in a particularly individual manner.

According to a particularly expedient embodiment, the rotary holder includes one or a plurality of spindles, each comprising at least one mandrel to which the container blank can be applied. The mandrel may extend vertically upwards or downwards and allows the preform to be easily attached.

In addition, a changeover of the oven or the container treatment plant can be accomplished in a particularly easy manner, when the spindle is coupled to the carriage section via a quick fastener.

The preforms can be conducted through the oven in a particularly fast and reliable manner, when the spindle comprises a gripping section for gripping round the container blank.

It is also imaginable to grip the preform on the inner side of the opening with tongs. A cylindrically shaped cover ring will then protect the opening against heat.

In order to allow the rotary movement of the container blanks to be initiated, it will be of advantage when the spindle is provided with external teeth, e.g. on a gear, or with a force transmitting area, e.g. on a friction wheel.

In addition, it is particularly advantageous that each container blank of the plurality of container blanks accomplishes a predetermined, in particular an individual heating profile.

It is particularly advantageous when the conveying unit has provided thereon a contact area, which is complementary to the external teeth or the force transmitting area and with which said external teeth or force transmitting area cooperate so as to cause the container blank to rotate about its longitudinal axis. When the external teeth of the spindle engage external or internal teeth of the conveying unit, the container blanks are driven without any loss of energy. A transmission of force can be realized in a particularly easy manner, when the force transmitting area of the spindle is in frictional contact with a complementary contact area of the conveying unit. It is thus possible to apply, controlled via the speed of movement, a varying temperature profile across the circumference of the container blank. When, for example, the speed of movement is particularly slow along a certain path section, the respective unrolled area of the circumference of the bottle will dwell longer in front of the heat source and can thus absorb more heat. The gap resulting from the slow movement can be closed later on.

It is also particularly expedient when the conveying unit includes an alterable switch so as to separate a first number of carriers from a second number of carriers. This is particularly advantageous for conducting e.g. the carriers (pucks) or the bottle gripping means through a cleaning or sterilizing unit while the plant is in operation or for impressing a specific temperature profile on only each $n^{th}$ bottle.

Furthermore, it is of advantage when a storage track is provided for a specific number of carriers.

It will also be of advantage when, instead of a conventional closure having an external thread, and internal closure is used on the preform and on the bottle, respectively, said internal closure being pressed-in, snapped in position, welded-in or secured in a similar manner at an internal position. This type of closure would also offer the possibility of continuously conveying the preforms upstream of the blow molder and the bottles downstream of the blow molder through all treatment stations up to the packaging unit. The strong torsional forces which would otherwise occur can thus be avoided. The so-called "neck handling" can be carried out nevertheless. In addition, stable locking on the runner is thus possible via the opening of the preform or bottle. A transport of the preform or bottle up to the packaging unit through all treatment units can then be realized on the basis of linear motors. This also allows a further reduction of weight on the preform, since e.g. the supporting ring can be dispensed with.

A continuous transport up to and beyond the capper and up to the packaging unit, as a substitute for conventional modes of conveying preforms and containers, i.e. up to and into a package, can be realized. Since it is not necessary to convey the bottle in an upright position, this also allows the use of a variety of bottle bottoms and bottle geometries. The bottles are directly "placed" into the package. To this end, internal closures may be provided, which are pressed-in or screwed-in. An internal thread is here of advantage. However, preforms having no external threads for the conventional closures may be used as well. Fixing the preforms in position in the individual runners of the motor, which are also referred to as slides or carriers, can be accomplished via locking elements, bayonet locks or similar fastening modes. The fastening means may also be provided on the carrier out of center or laterally, so as to allow the conveying unit to be conducted laterally past the treatment stations.

Using an additional drive for a gripping element on the carrier is considered especially for varying the distance between the preform or the bottle and the carrier, or for gripping systems.

An additional drive can also be provided for arresting the preform.

As has already been mentioned, an alterable switch system may be provided for dividing/combining the individual carriers moving to and/or coming from the treatment stations.

For reducing the space requirements, it is also imaginable to arrange the treatment units one on top of the other.

Also discharge after an inspection can be realized by the embodiment according to the present disclosure, just as sporadic discharge for quality-control measures, such as a screw-on value control, a fixed-value control or transport into a laboratory. The bottles may also be printed on, e.g. labelled or provided with sprayed-on ink or marked with a laser, during transport.

When the bottles are labelled or printed on while moving past the labelling/printing unit, a short stop can be realized as well. Due to the magnetic drive-mode, such a short stop can easily be controlled. Furthermore, it is possible to use a plurality of units serially and/or in parallel for increasing the performance.

Maintenance, cleaning and or sterilization of the individual carriers and runners of the linear synchronous motor leads to an operating mode requiring less maintenance and to improved hygiene.

An integration of RFID chips into the carriages makes it also easier to track each individual bottle and each individual preform.

Conveying the preforms or bottles at an oblique, horizontal or upright position is additionally advantageous, in particular if a bipartite preform holder or holders, which can accommodate a plurality of preforms, is/are used.

Individual carriers may also be brought to a changeover site as conveying elements for change parts, which are used during a changeover process, such as molds, stretching stoppers, filling vales or the like.

At locations necessitating high precision and/or high acceleration, a mechanical guide means, which positions the carriage precisely, may be integrated, e.g. an electromechanical combination. This is also easy to realize, since, due to the low weight of the unit, the forces to be accelerated/decelerated are governable. The individual carriage may, of course, also be driven and/or guided fully mechanically, preferably at locations where strong forces occur. To this end, a transport unit, e.g. a toothed rack arranged at the side or at the top, may be configured as an engagement unit and may be restraint-guided. A possibly existing supporting ring is then only used as a limit stop for the preforms or bottles. The preforms are passed through the oven in series, and a holding clip can be configured such that an external drive allows the preforms to be rotated.

During conveyance with the conveying element described, the bottles may also be moved past an inspection unit or/and a nitrogen droppler. In addition, the bottles may be divided into lanes via a distributing system before they are transferred to an underfloor belt.

Furthermore, it will be of advantage when each container blank of the plurality of container planks accomplishes a predetermined, in particular an individual heating profile.

BRIEF DESCRIPTION OF THE DRAWINGS

The disclosure is also explained in more detail with the aid of a drawing, which shows a plurality of embodiments.

DETAILED DESCRIPTION

Figure 1:
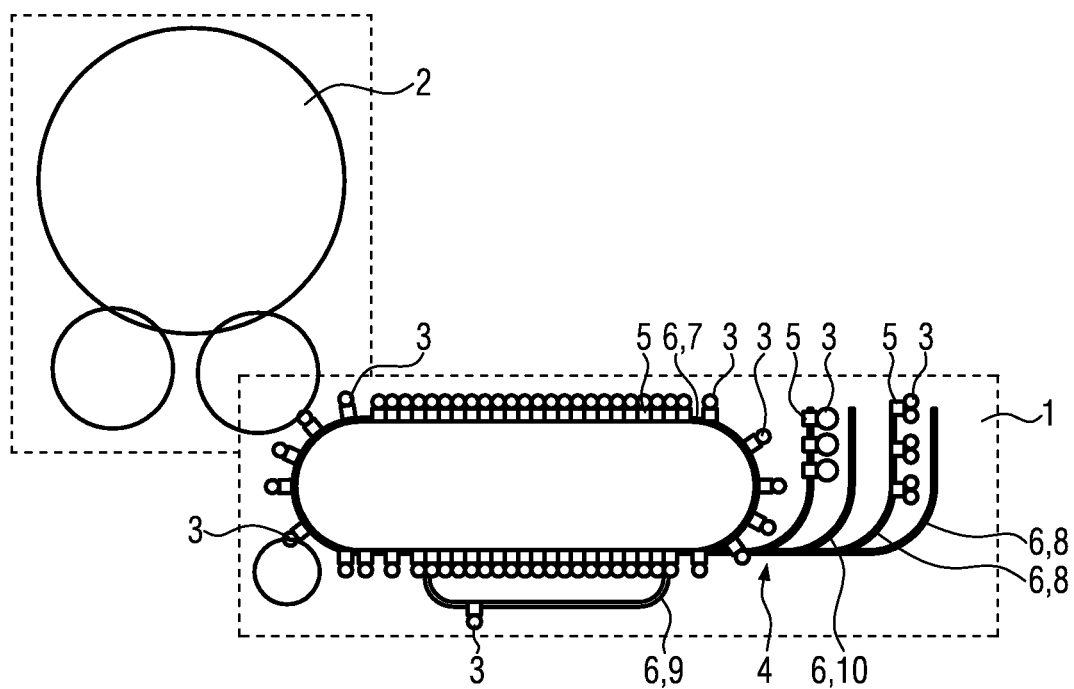
FIG. 1 shows, in a schematic view from above, a container treatment plant comprising an oven and a blow molder, which can also be referred to as blow molding machine, according to a first embodiment.

The figures are only of a schematic nature and serve to make the disclosure more easily understandable. Like reference numerals designate like parts.

FIG. 1 shows an oven 1 coupled to a blow molder 2. The blow molder 2 is also referred to as blow molding machine. The oven and the blow molder 2 are used as components of a container treatment plant according to the present disclosure.

Container blanks 3, which are also referred to as preforms, are conducted through the oven 1 by means of a conveying unit 4 and carriers 5 sliding thereon. The conveying unit 4 comprises conveying paths 6. The conveying path 6 comprises different sections, e.g. a curved-track conducting section 7, a plurality of infeed tracks 8 and a pass-by track 9. In addition, a holding track 10 is provided, which may also be configured as a storage track. The curved-track conducting section 7 may also be referred to as oven track.

The conveying unit 4 with its conveying path 6 may also extend not only through the oven but also through the blow molder 2. The carriers 5 which are individually movable on the conveying path 6 and capable of receiving thereon the container blanks 3 can then be conducted individually on the same conveying unit 4 and, consequently, on the same conveying path 6 through the oven 1 as well as through the blow molder 2. This embodiment is, however, not explicitly shown in the figures.

Figure 2:
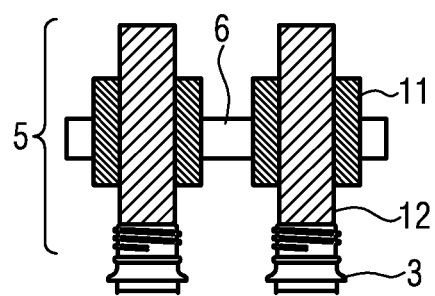
FIG. 2 shows a detailed representation of a detail of the conveying unit within the oven according to FIG. 1 with container blanks movable via carriers.

As can be seen in a particularly clear manner in FIG. 2, the carriers 5 are slidingly supported on the conveying path 6, set in motion and sent through the oven 1. In the course of this process, they enter the operating area of one or a plurality of infrared radiators within a heating track.

The carriers 5 include a carriage section 11 having a spindle 12 secured thereto. The spindle 12, which is horizontally oriented in the embodiment shown in FIG. 2, has a container blank 3 attached thereto. The carriers 5 are configured as parts moved in a magnetic force dependent manner or they include a servomotor.

Figure 3:
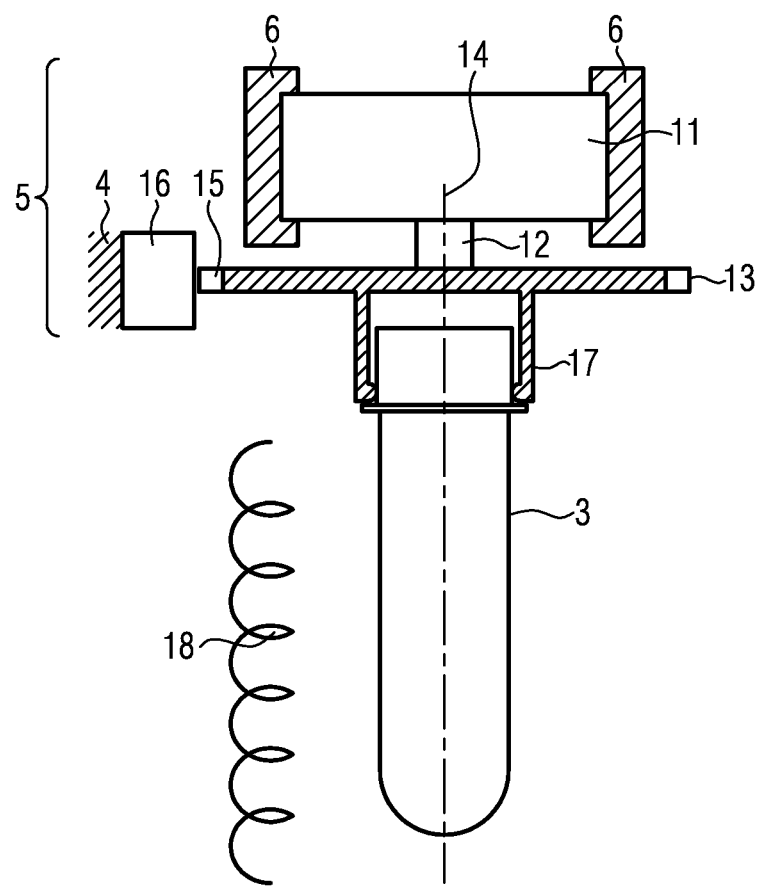
FIG. 3 shows an alternative embodiment of the embodiment shown in FIG. 2.

FIG. 3 shows a variant of a carrier 5, said carrier 5 comprising a carriage section 11 configured as a runner or a carrier, which is slidingly supported in a conveying path 6 on two sides thereof, the carriage section 11 being connected to a spindle 12 having a gear or a friction wheel 13 secured thereto. The gear or friction wheel 13 is connected to the carriage section 11 such that it is adapted to be rotated about a common longitudinal axis 14 relative to the carriage section 11.

In FIG. 3 the gear or friction wheel 13 is provided with external teeth 15 that are coupled through a force and/or form fit connection to a complementary contact area 16 on the conveying unit 4. When the carriage section 11 moves out of the image plane, the external teeth 15 roll on the contact area 16, whereby the gear or friction wheel 13 is set in a rotary motion. The gear or friction wheel 13 also has provided thereon a gripping section 17, which grips an end of the container blank 3 from outside. The container blank 3 is arranged adjacent to a heating device 18 of the oven 1. Said heating device 18 may be configured as one or a plurality of infrared radiators.

According to one embodiment of the present disclosure, each carrier is preferably configured such that it has a power supply of its own. Each carrier may, for example, have provided therein a storage battery or a capacitor supplying at least part of the carrier with power. The storage battery can be recharged e.g. during routine maintenance or downtimes of the carrier. Processes suitable for this purpose are contactless processes, e.g. those making use of induction. According to a specially preferred embodiment, an induction field extends over a certain area of the container treatment plant. When the carriers periodically pass through this area at specific time intervals, this can suffice to charge the storage battery. Alternatively, also the whole area of the container treatment plant may be flooded by a respective induction field, so that the carriers are permanently supplied with power in a contactless manner.

When the carrier is provided with such a power supply of its own, it is also possible to use independently operating motors, which are provided separately in each carrier, e.g. for rotating or pivoting the container conveyed by the carrier. To this end, piezomotors can preferably be used, since they are thrifty and fast on the one hand and easy to control on the other.

Figure 4:
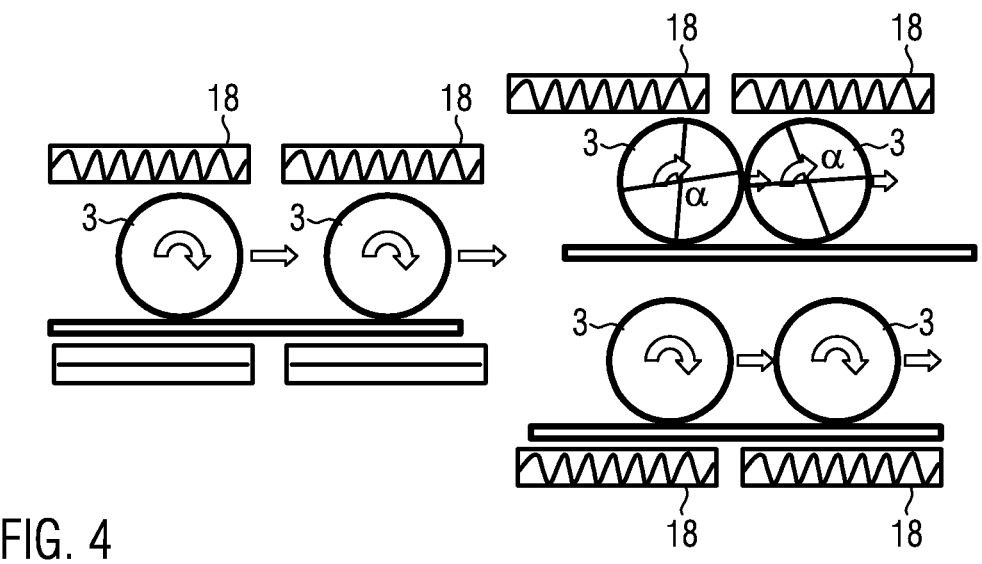
FIG. 4 shows a division of a stream conveyed through the container treatment plant according to FIG. 1.

FIG. 4 shows a control of the individual carriers 5 in such a way that a blow molder 2 can be equipped with different molds. Each container blank 3 can have impressed thereon a temperature profile of its own on its way through the oven 1. Slow rotations over "α-fast" rotations are accomplished through the residual angle, i.e. the container blank 3 rotates slowly through the angle α, which means that it has a slow speed of movement, and absorbs more heat in the circumferential area of the angle α. The residual part of the rotation takes place with high speed, i.e. the container blank has a high speed of movement. The use of alterable switches is here not necessary. A so-called "preferential heating" can be accomplished in this way. Each container blank 3 can be heated individually.

Figure 5:
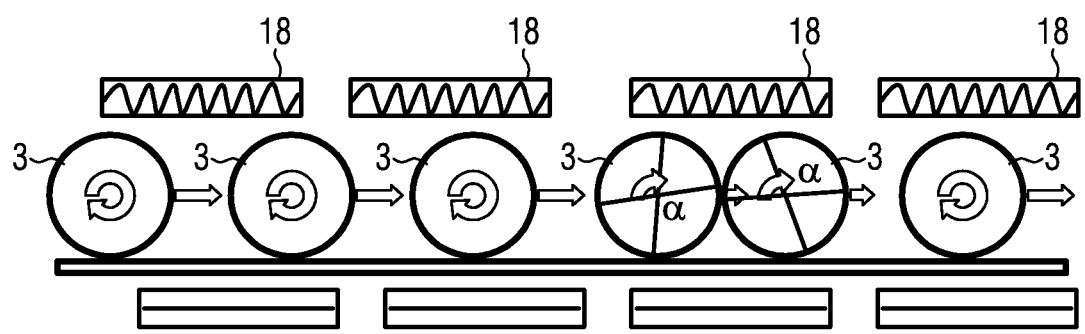
FIG. 5 shows a mode of controlling the container blanks conducted through the oven according to FIG. 1.

FIG. 5 shows the control of a stream of container blanks. The stream is here not divided. The rotary speed is controlled depending on the respective translational speed of the container blanks 3. In the case of normal speeds, the container blank 3 is rotated with a normal speed of rotation. When the translational speed is slow, e.g. in the case of a jam, the container blank 3 is rotated with a changed speed, more slowly or more rapidly. In particular a fast rotation will then be of advantage. Also a sectionwise fast rotation and subsequently slower rotation is possible.

Subsequently, a normal translational speed follows, the speed of rotation being then normal again. The temperature profile on the circumference of the container blank 3 is established on the basis of the changing fast and slow movement of the container blank 3 past the radiator.

The rotary movement is caused by a chain wheel that is in rolling contact with a chain. Alternatively, the rotary movement may also be caused by belt pulley that is in rolling contact with a belt. When the container blank 3 moves slowly, the blank 3 is rotated through the angle α until a changeover to fast phases takes place and the container blank 3 is rotated through the residual angle. Subsequently, the container blank 3 continues its movement at a slower speed.

At the end of the heating track, the container blank 3 is adapted to the pitch of the blow molder 2. A slow translational speed is related to a slow rotation, whereas a fast movement is related to a fast rotation, if the conveying unit used for the blow molder 2 is e.g. a conventional conveying unit instead of the same conveying unit 4. Buffer tracks for slow travel may be provided, in particular when the angle α is very large.

Figure 6:
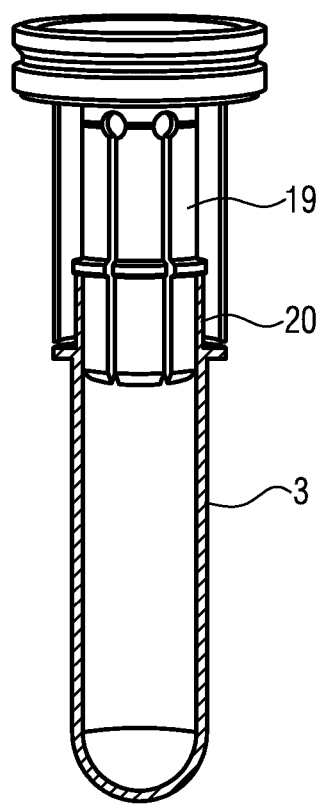
FIG. 6 shows a preform with a cylindrical cover ring in a partly perspective and partly sectional view.

FIG. 6 shows the cooperation of the preform 3 with a cover ring 19 protecting an orifice 20 of the preform 3.

Figure 7:
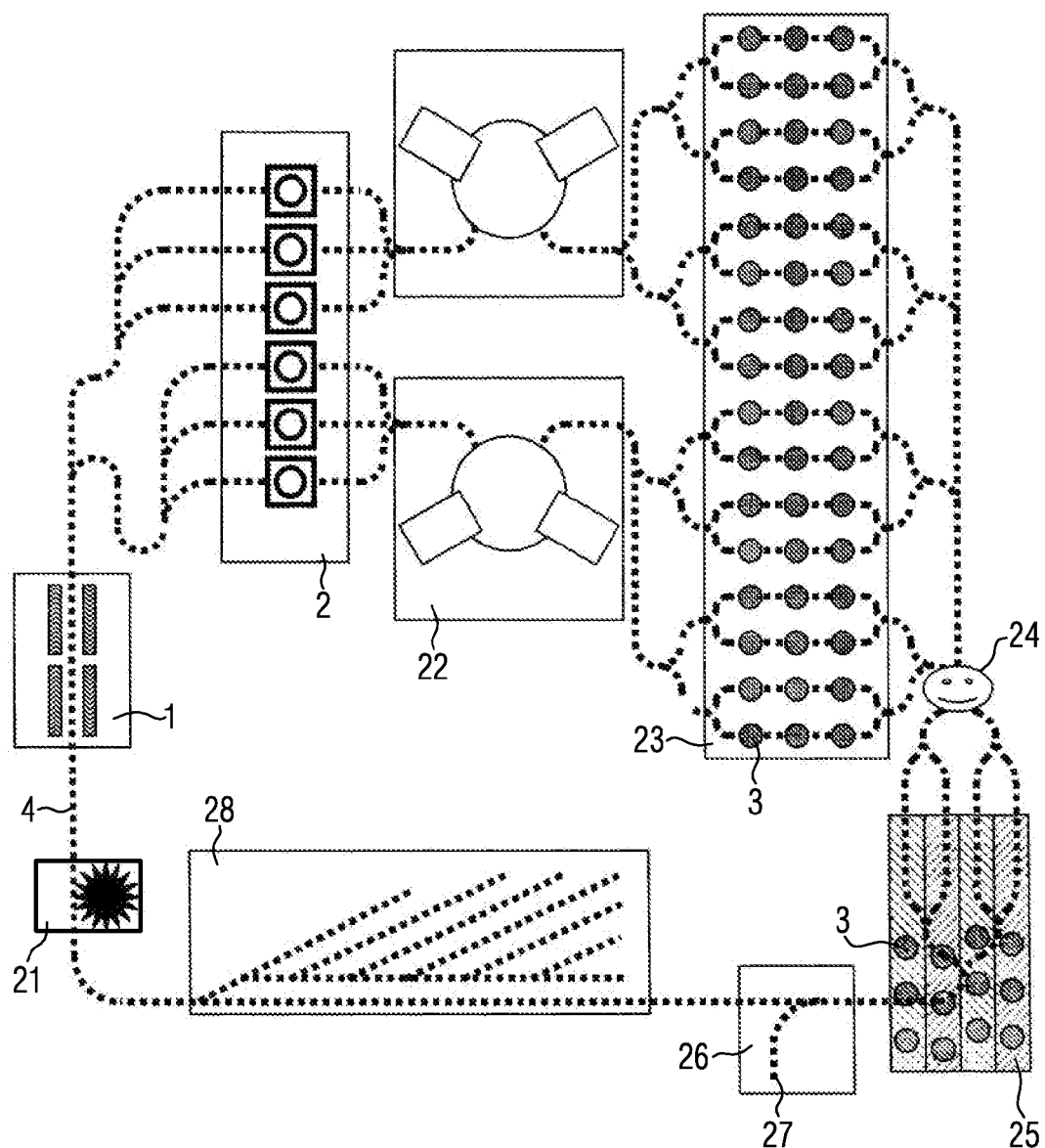
FIG. 7 shows an extended container treatment plant according to the present disclosure in a schematic representation for illustrating the flow of container blanks and bottles, respectively.

FIG. 7 shows a container treatment plant according to the present disclosure. One and the same conveying unit 4 conducts here individual carriers 5 through different treatment units, such as the oven 1 and the blow molder 2. In addition, the carriers 5 also pass through an application unit 21, a labeller 22, a filling unit 23, an inspection device 24, a lane divider 25, a tester 26 with a discharge device 27, and a buffer 28.

The inspection device 24 may also be replaced by a person.

Making use of a variant which is here not shown, individual treatment stations may also be bypassed by providing adequate alterable switches.

By means of the embodiment shown in FIG. 7, the containers and/or preforms can be conducted in an individual fashion through the whole container treatment plant so that special conditions can also be realized for individual containers. For example, the application unit 21 may first apply a container to one of the carriers. Subsequently, the preforms may be conducted e.g. in series through the oven 1. The present embodiment may also be conceived such that the clips or holders holding the preforms are provided with motors so that the preforms can be rotated. A particularly advantageous aspect is that, due to the separate controllability of the carriers, the paths and speeds of individual carriers can be adjusted. The dwell time of a preform between the end of heating and the beginning of blow molding can thus always be kept constant, even if the blow molding stations are fixed in space. In this sense it is also of advantage that the movement of the individual carriers can be controlled separately. The movement of the carriers with the preforms through the oven 1 can thus be configured individually. It is e.g. possible to vary the distance between individual carriers in the oven depending on the size of the container/preform. The best possible heating profile is thus accomplished by controlling the distance between the individual preforms. In addition, the track leading through the oven 1 may comprise a plurality of subtracks interconnected by alterable switches. By rerouting individual carriers, specific containers or all the containers can be guided onto these subtracks. There, the heating profiles of the preforms can be qualitatively influenced. In a first subtrack a first heating profile (temperature gradient) may, for example, be impressed on the containers conducted on this subtrack, whereas other containers, which are conducted on another subtrack, have impressed thereon a different heating profile. In addition, an increased or reduced heating period, in comparison with the standard heating period, can be realized by conducting the preforms along individual subtracks, in that e.g. the conveying speed of the carriers on the individual subtracks is varied. Finally, an additional discharge track 27 may be provided, through which the carriers and the containers conveyed thereby can be removed from the oven, if e.g. some kind of malfunction occurs.

For additionally reducing the changeover times required for the whole container treatment plant and in particular the oven 1, a storage track or a wait loop may be provided, in which specific carriers with specific holders for carriers are stored temporarily. For example, only carriers of type a may be used for type A containers (type A preforms), whereas carriers of type b may be kept in the wait loop for type B containers. When the plant is changed over to type B containers, the carriers of type a can be replaced by carriers of type b, the carriers b being then e.g. introduced in the oven and the carriers a conducted onto the storage track. This exchange of carriers can take place preferably automatically, e.g. in that a command that all carriers of a specific type should be replaced by carriers of another type is transmitted via a user interface to the conveying system. To this end, each carrier may be provided with an identification or identifying unit through which the conveying system is able to identify the carrier.

According to a specially preferred embodiment, each carrier comprises a separate arithmetic unit instead of, or in addition to a (passive) identification or an identifying unit. In view of the dimensions of the carrier this arithmetic unit is not a complete computer, but each carrier is intended to include a processing unit and a memory associated therewith, so that comparatively small routines can be executed via this processing unit. To this end, the processing unit may, e.g. via a wireless connection, also be connected to the control unit controlling the container treatment plant, so as to exchange commands and transmit e.g. an identification signal. The carrier is thus much more autonomous, whereby little process steps, such as a rotation or a pivotal movement of the preform or bottle, can be controlled and executed by means of the processing unit. In this context it may also be of advantage when, for the purpose of exchanging data with the control unit, the carrier includes a suitable wireless transponder, which is adapted to be used for wireless transmission and reception of data. Since the carrier is thus, in principle, suitable for wireless data transmission, also an exchange of data between individual carriers may take place. In this way, the carriers mutually communicate their current position to one another.

In addition, it is thus also possible to control product-dependent paths and actions of the carrier through the processing unit. For example, a first preform conveyed by a first carrier may be intended to dwell in the oven 1 for a time t1, whereas a second preform conveyed by a second carrier dwells in the oven for a time t2. If the carrier with the processing unit is equipped with identification units for containers or preforms (e.g. sensors capable of determining e.g. the size or the mass of the preform in a technically simple manner, such as a weighing cell or a spring force meter), the carrier will be able to recognize the preform either autonomously or by exchanging a certain amount of data with the control unit of the preform, and the first carrier can be controlled, by means of the processing unit associated therewith, such that it will choose independently a path through the oven 1, so that the preform dwells in the oven 1 for the time t1, whereas the second carrier is caused to dwell in the oven 1 for the time t2 by the processing unit associated therewith.

It is especially preferred when the capacity of the processing unit alone suffices for such product-dependent process steps, without any exchange of data with the control unit being necessary. The carrier will then be able to carry out product-dependent process steps in an autonomous manner.

The processing unit and the memory associated therewith may also be used for collecting current process data concerning the container and/or preform conveyed by the carrier in question. The processing unit is thus able to collect (in real time) data on the heating temperature to which the preform was exposed in the oven 1, and these data may e.g. be read automatically from the memory and processed during packaging or during the final examination of a container. Other possibilities of use exist here as well. For example, the processing unit may detect in which blow mold the container was produced, in which filling unit it was filled, in which labelling unit it was labelled and which label roll was used for this purpose, or with which printing module it was printed on. Also the whole production time can be ascertained in this way. Various embodiments are here imaginable. In principle, it is thus possible to ascertain for each container individually all the process-relevant data. Practicable and preferred embodiments are, however, those in the case of which only the most important characteristics of individual production or processing processes are registered. If the container or preform is conveyed by more than one carrier during its production process, as has exemplarily been described hereinbefore, it is e.g. possible that, during transfer from one carrier to the next, also the container-specific information stored in the first carrier is transmitted to the second carrier, preferably with information on the first carrier, so that a complete tracking of the whole production process is here given. This also allows permanent error checking and quality control by automatic means. If, for example, an evaluation of the data shows that the dwell time of a container in the oven was too long, or that the container filling time was too short, or that the container was incorrectly labelled or printed on, the container in question can be sorted out automatically.

If the container treatment plant comprises a labeller or one or a plurality of labelling modules, the carriers can be transferred from the original conveying track to the labeller, so that the containers conveyed by the carriers can be labelled. Subsequently, the carriers can be conducted back onto the conveying track (magnetic track). In so doing, the transfer may be realized by separate transfer means that are able to take over the carriers together with the containers from the conveying track. The carriers may, however, also be conducted via a system of alterable switches onto some other magnetic track leading through the labeller.

The use of alterable switches may also be of advantage for filling units. If the filling unit for filling containers comprises a plurality of filling stations, the containers can be advanced to the filling stations by means of the carriers via a suitable system of alterable switches. For example, if a total of 16 filling stations is provided, 3, 4 or 5 or more containers may be filled in parallel, whereby a substantial amount of time is saved. In addition, the system of alterable switches can be used for realizing a container filling process in which containers coming from different preceding processing units can be filled. For example, bottles, which were previously printed on or labelled, can be supplied via alterable switches to one and the same filling unit and filled (in parallel). A very flexible treatment plant can be created in this way, since treatment steps for a first number of containers may be partially different from the treatment steps for a second number of containers, with individual treatment steps, such as filling or sealing steps, being allowed to overlap, without the necessity of providing for this purpose separate treatment devices, such as two separate filling devices or sealing devices.

It is thus also possible to divide the containers, which are conveyed by the carriers, into a plurality of lanes and separate conveying lines, respectively, before transferring them e.g. to an underfloor belt, so that unordered positioning of the containers or tilting of individual containers is avoided.

It may here also be of advantage to recombine individual conveying lines so as to obtain one line. If, for example, an inspector or a nitrogen droppler are provided, containers conveyed on different conveying lines may first be rerouted onto a common conveying line and then conducted through the inspector or nitrogen droppler.

In addition, each carrier may be provided with a plurality of holders for containers. Thus, a plurality of containers can be conveyed simultaneously by one carrier. It may also be of advantage to provide specific carriers exclusively for a specific area of the container treatment plant. For example, carriers with a plurality of holders may e.g. be used for conveying carriers over comparatively long distances, whereas carriers comprising only one holder are used for conveying preforms through the oven 1.

If an inspection device 24 is provided, the carriers may, after having left the inspection device 24 and depending on the result of the inspection, either be conducted via a suitable alterable switch back onto the actual conveying lines or conducted onto a separate line for the purpose of maintenance. Since the running time, for which a specific carrier has already been in operation, can be detected e.g. via the control unit, the disclosure may also be so conceived that, irrespectively of the result provided by the inspection device 24, a carrier is advanced onto the maintenance line after a predetermined period.

The invention claimed is:

1. A container treatment plant, comprising an oven, a blow molder located downstream of the oven and used for processing a plurality of container blanks, a conveying unit configured for conveying a plurality of carriers, each carrier being provided for accommodating at least one container blank, the conveying unit and the carrier adapted to cooperate with one another such that each carrier is individually movable through the container treatment plant by means of said conveying unit and at least one of the carriers is configured for movement in a magnetic force dependent manner, wherein each carrier comprises at least one rotary holder configured for rotatingly accommodating a container blank, wherein the oven comprises at least one infrared radiator.

2. The container treatment plant according to claim 1, the conveying unit and the carrier being further adapted to cooperate with one another such that each carrier can be used for individually moving a container blank through the oven by means of said conveying unit.

3. The container treatment plant according to claim 1, the same conveying unit fully extending through the oven and further extending through the blow molder, so that the same carrier can be moved through the oven as well as through the blow molder, with the container blank remaining inserted therein.

4. The container treatment plant according to claim 1, and at least one of the carriers includes a servomotor used for the purpose of driving.

5. The container treatment plant according to claim 1, and the oven has a flexible pitch.

6. The container treatment plant according to claim 1, and the at least one carrier includes a carriage section, which rests on the conveying path, and at least one rotary holder projects from the carriage section.

7. The container treatment plant according to claim 6, and the rotary holder includes one or a plurality of spindles, each comprising at least one mandrel to which the container blank can be applied.

8. The container treatment plant according to claim 7, and at least one spindle is coupled to the carriage section via a quick fastener.

9. The container treatment plant according to claim 7, and at least one spindle comprises a gripping section for gripping round the container blank.

10. The container treatment plant according to claim 7, and at least one spindle is provided with external teeth or with a force transmitting area.

11. The container treatment plant according to claim 7, each container blank of the plurality of container blanks accomplishes a predetermined heating profile.

12. The container treatment plant according to claim 1, and the container blanks comprise preforms.

13. The container treatment plant according to claim 1, and the movement is in interaction with a conveying path of the conveying unit, on which the at least one of the carriers slidingly rests.

14. The container treatment plant according to claim 10, and the at least one spindle provided with external teeth comprises a gear.

15. The container treatment plant according to claim 10, and the at least one spindle provided with a force transmitting area comprises a friction wheel.

16. The container treatment plant according to claim 11, and the predetermined heating profile comprises an individual heating profile.

\* \* \* \* \*